(12) United States Patent
McGarry et al.

(10) Patent No.: US 10,107,380 B2
(45) Date of Patent: Oct. 23, 2018

(54) DRIVE ASSEMBLY, COVER AND ASSOCIATED KIT

(71) Applicants: Hub City, Inc., Aberdeen, SD (US); Regal Beloit America, Inc., Beloit, WI (US)

(72) Inventors: Thomas Joseph McGarry, Aberdeen, SD (US); Garret David Heath, Brookings, SD (US); Simon Andrew Odland, Fort Wayne, IN (US); Timothy Joseph Brakefield, Perrysburg, OH (US)

(73) Assignee: Regal Beloit America, Inc., Beloit, WI (US)

( * ) Notice: Subject to any disclaimer, the term of this patent is extended or adjusted under 35 U.S.C. 154(b) by 490 days.

(21) Appl. No.: 14/739,338

(22) Filed: Jun. 15, 2015

(65) Prior Publication Data

US 2016/0363207 A1    Dec. 15, 2016

(51) Int. Cl.
*F16H 57/031* (2012.01)
*F16D 3/84* (2006.01)

(52) U.S. Cl.
CPC .......... *F16H 57/031* (2013.01); *F16D 3/843* (2013.01); *F16D 2300/26* (2013.01); *Y10T 403/7007* (2015.01)

(58) Field of Classification Search
CPC . F16D 3/84; F16D 3/841; F16D 3/843; F16D 2300/26; F16H 57/031; H02K 5/00; H02K 5/04; H02K 5/10; H02K 5/22; Y10T 403/16; Y10T 403/7007; Y10T 403/7073; Y10T 403/7092; Y10T 403/7094

USPC .......... 464/170; 403/11, 349, 375, 380, 381
See application file for complete search history.

(56) References Cited

U.S. PATENT DOCUMENTS

| | | | |
|---|---|---|---|
| 1,201,706 A * | 10/1916 | Dodge | F16B 2/065 403/381 |
| 1,356,899 A * | 10/1920 | Baits | F16D 3/40 464/113 |
| 3,284,660 A | 11/1966 | Abraham et al. | |
| 3,504,769 A | 4/1970 | Mettig | |
| 3,714,779 A | 2/1973 | Stein et al. | |
| 3,729,572 A * | 4/1973 | Helin | H02G 3/083 174/66 |
| 4,324,533 A * | 4/1982 | Schroeder | F16P 1/02 403/11 |
| 4,407,023 A * | 10/1983 | Norton | E03C 1/042 137/359 |
| 5,083,539 A | 1/1992 | Cornelio | |
| 5,086,732 A | 2/1992 | Seno | |
| 5,133,617 A * | 7/1992 | Sokn | F04D 29/626 403/343 |

(Continued)

FOREIGN PATENT DOCUMENTS

| | | | | |
|---|---|---|---|---|
| CA | 2462988 A1 * | 10/2005 | | F16D 3/26 |
| CA | 2809622 A1 * | 10/2013 | | F16D 3/10 |

(Continued)

*Primary Examiner* — Josh Skroupa
(74) *Attorney, Agent, or Firm* — John Wagley

(57) ABSTRACT

A cover for use on a drive is adapted to be received by a feature on the drive. The cover includes a body and a mount. The mount is operably associated with the body. The mount is also adapted to cooperate with the feature on the drive to removably secure the cover to the drive. The mount and the body are separate components.

17 Claims, 23 Drawing Sheets

(56) References Cited

U.S. PATENT DOCUMENTS

| | | | |
|---|---|---|---|
| 5,145,424 A | 9/1992 | Han | |
| 5,480,003 A | 1/1996 | Hill et al. | |
| 5,873,144 A * | 2/1999 | Tupper | B60B 7/02 16/18 CG |
| 6,070,928 A * | 6/2000 | Campbell | B60R 13/0275 174/152 G |
| 6,161,589 A * | 12/2000 | Bolotte | F16L 5/02 138/106 |
| 7,112,744 B1 * | 9/2006 | DeCosta | H02G 3/14 174/135 |
| D548,577 S * | 8/2007 | Shiffler | D8/376 |
| 7,645,946 B2 * | 1/2010 | Smith | F16L 5/02 174/650 |
| 7,758,433 B2 * | 7/2010 | Yamauchi | F16D 3/843 464/173 |
| 7,891,606 B2 | 2/2011 | Guering | |
| 7,931,228 B2 | 4/2011 | Omdoll | |
| 8,037,574 B2 * | 10/2011 | Chase | A47B 91/06 16/42 R |
| 8,120,831 B2 | 2/2012 | Qian | |
| 8,240,944 B2 * | 8/2012 | Chang | G09F 3/06 403/348 |
| 8,297,150 B2 | 10/2012 | Dismon et al. | |
| 8,303,266 B2 * | 11/2012 | Rush | F04D 29/426 310/89 |
| 8,350,153 B1 * | 1/2013 | DeCosta | H02G 3/14 174/135 |
| 8,701,624 B2 | 4/2014 | Andersson et al. | |
| 9,669,655 B1 * | 6/2017 | Soliman | B60B 7/10 |
| 2011/0143872 A1 | 6/2011 | Chen et al. | |
| 2011/0147143 A1 | 6/2011 | Park | |
| 2013/0139557 A1 | 6/2013 | Chen | |
| 2014/0064652 A1 | 3/2014 | Beyfuss et al. | |
| 2015/0198232 A1 | 7/2015 | Haines et al. | |

FOREIGN PATENT DOCUMENTS

| | | | |
|---|---|---|---|
| DE | 10233509 A1 * | 2/2004 | F16D 3/843 |
| GB | 1386684 A * | 3/1975 | F16D 3/84 |

* cited by examiner

DRIVE ASSEMBLY, COVER AND ASSOCIATED KIT

BACKGROUND OF THE INVENTION

The embodiments described herein relate generally to mechanical drives, and more specifically, to a cover for a mechanical drive.

Mechanical drives are used extensively commercially to drive mechanical components. Typically the components are rotationally driven. The mechanical drives provide for a power input, typically in the form of an electric motor or other means. The mechanical drives are used to either increase or decrease the speed of the motor and/or to change the orientation and/or direction of the drive power, typically raising or lowering and/or changing its angular direction. Mechanical drives typically have rotating couplings and shaft ends. Covering these couplings and ends may be desirable for a number of reasons. Covers for these couplings and ends may make needed access to the mechanical drives for maintenance, repair and servicing difficult and/or time consuming. Typically these covers are secured to the drives by fasteners, typically threaded fasteners with heads, which provide exposed surfaces to the worker that may not be smooth. Adequately securing these covers to the drives makes access to the drives even more difficult and/or time consuming.

The present invention is directed to alleviate at least some of these problems with the prior art.

BRIEF DESCRIPTION OF THE INVENTION

According to an embodiment of the invention, a cover for use on a drive is provided. The cover is adapted to be received by a feature on the drive. The cover includes a body and a mount. The mount is operably associated with the body. The mount is also adapted to cooperate with the feature on the drive to removeably secure the cover to the drive. The mount and the body are separate components. Note that The mount may be either integral to the drive or may be a component separate from the drive.

According to an aspect of the invention, the cover may be configured such that the mount and the feature on the drive are adapted for use with fasteners to connect the mount to the drive. Adhesives or other means may be used to connect the mount to the drive.

According to another embodiment of the invention, a drive assembly is provided. The drive assembly includes a drive having a feature of the drive. The drive assembly also includes a cover adapted to cover at least a portion of the exterior of the drive. The cover has a body and a mount operably associated with the body. The mount is adapted to cooperate with the feature on the drive to removeably secure the cover to the drive. The mount and the body are separate components.

According to an aspect of the invention, the drive assembly may be configured such that the mount and the feature on the drive are adapted for use with fasteners. The fasteners are adapted to secure the mount to the drive. Adhesives or other means may be used to connect the mount to the drive.

According to another aspect of the invention, the drive assembly may be configured such that the drive includes a shaft and such that the cover is adapted to surround a portion of the shaft and to permit a portion of the shaft to extend from the cover.

According to another aspect of the invention, the drive assembly may be configured such that the body includes a first component and a second component.

According to another aspect of the invention, the drive assembly may be configured such that the drive includes a shaft and such that the cover is adapted to surround a portion of the shaft. The first component and the second component are selectably connectable and separable by relative motion therebetween along an axis that is normal or parallel to a longitudinal axis of the shaft.

According to yet another aspect of the invention, the drive assembly may be configured such that the first component and/or the second component include a protrusion and such that the other of the first component and/or the second component defines an aperture adapted to receive the protrusion.

According to yet another aspect of the invention, the drive assembly may be configured such the body includes a feature to assist in grabbing the body.

According to yet another aspect of the invention, the drive assembly may be configured such that the mount comprises an adaptor and wherein the adaptor includes a drive feature for cooperating with the feature of the drive. The drive assembly may be further configured such that the adaptor also includes a body feature for cooperating with the body to removeably secure the body to the drive; and such that the body includes an adaptor feature for cooperating with the adaptor to removeably secure the body to the drive.

According to yet another aspect of the invention, the drive assembly may be configured such that the drive feature of the adaptor include a surface of the adaptor, such that the feature of the drive includes a surface of the drive, and the drive assembly also includes an adhesive positioned on the surface of the adaptor and on the surface of the drive.

According to yet another aspect of the invention, the drive assembly may be configured such that the body feature of the adaptor and the adaptor feature of the body provide for one of a linear, rotational, or spiral securing and removing the adaptor to the body. It should be appreciated that the body feature of the adaptor and the adaptor feature of the body may be configured such that securing and removing of the adaptor to the body may linear, rotational, or spiral.

According to yet another aspect of the invention, the drive assembly may be configured such that either the body feature of the adaptor or the adaptor feature of the body include a protrusion extending therefrom and such that the other of the body feature of the adaptor or the adaptor feature of the body defines a void for receiving the protrusion.

According to yet another aspect of the invention, the drive assembly may be configured such that the body feature of the adaptor comprises the protrusion.

According to yet another aspect of the invention, the drive assembly may be configured such that the adaptor feature of the body comprises the protrusion.

According to yet another aspect of the invention, the drive assembly may be configured such that the body feature of the adaptor includes a flange and such that the adaptor feature of the body includes an inner periphery of the cover.

According to yet another aspect of the invention, the drive assembly may be configured such that the adaptor feature of the body further includes a protrusion extending from the inner periphery of the body and such that the flange of the adaptor defines a void for receiving the protrusion.

According to yet another aspect of the invention, the drive assembly may be configured such that at least a portion of either the body feature of the adaptor and the adaptor feature of the body is resilient and such that at least a portion of the body feature of the adaptor and at least a portion of the adaptor feature of the body cooperate to lock the cover to the adaptor.

According to yet another aspect of the invention, a kit is provided. The kit includes a first drive having an adaptor mounting feature and a second drive having an adaptor mounting feature. The kit further includes a body adapted to cover a selectable one of at least a portion of the first drive and at least a portion of the second drive. The body includes an adaptor mounting feature. The kit further includes an adaptor adapted to cooperate with a selected one of the adaptor mounting feature of the first drive and the adaptor mounting feature of the second drive to secure the adaptor to the selected one of the first drive and the second drive. The adaptor further adapted to cooperate with the adaptor mounting feature of the body to removeably secure the body at least indirectly to the selected one of the first drive and the second drive.

According to yet another aspect of the invention, the kit may be configured such that the body and the adaptor are adapted to permit the adaptor to be assembled onto a selected one of the first drive and the second drive using at least one fastener.

DETAILED DESCRIPTION OF THE INVENTION

Mechanical drives are used extensively commercially to drive mechanical components. Typically the components are rotationally driven. The drives provide for power input, typically in the form of an electric motor or other means. The mechanical drives are used to either increase or decrease the speed of the motor and may also be used to change the orientation and/or direction of the drive, typically raising or lowering and/or changing its angular direction. Mechanical drives typically have rotating couplings and shaft ends. Covering these couplings and ends may be desirable for a number of reasons. Covers for these couplings and ends may make needed access to the mechanical drives for maintenance, repair and servicing difficult and/or time consuming. Adequately securing these covers to the drives makes access to the drives even more difficult and/or time consuming.

Figure 1:
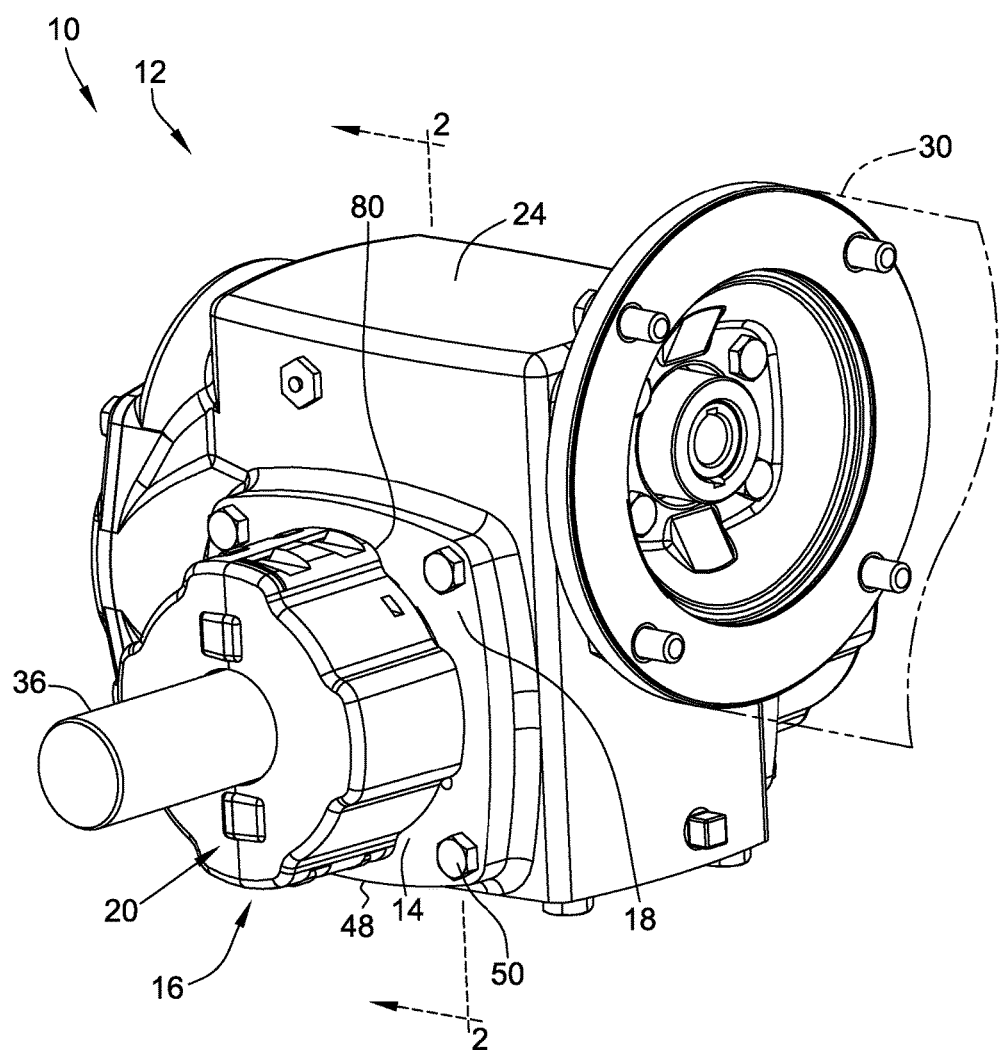
FIG. 1 is a perspective view of an embodiment of the present invention in the form of a drive assembly.

According to an embodiment of the present invention and referring to FIG. 1, a drive assembly 10 is provided. The drive assembly 10 includes a drive 12 having a feature 14 of the drive 12. The drive assembly 10 also includes a cover 16 adapted to cover at least a portion of exterior 18 of the drive 12. The cover 16 has a body 20 and a mount 22 (see FIG. 3) operably associated with the body 20. The mount 22 is adapted to cooperate with the feature 14 on the drive 12 to removeably secure the cover 16 to the drive 12. The mount 22 and the body 20 are separate components. As shown in FIG. 1, the mount 22 is in the form of adaptor 22.

Figure 2:
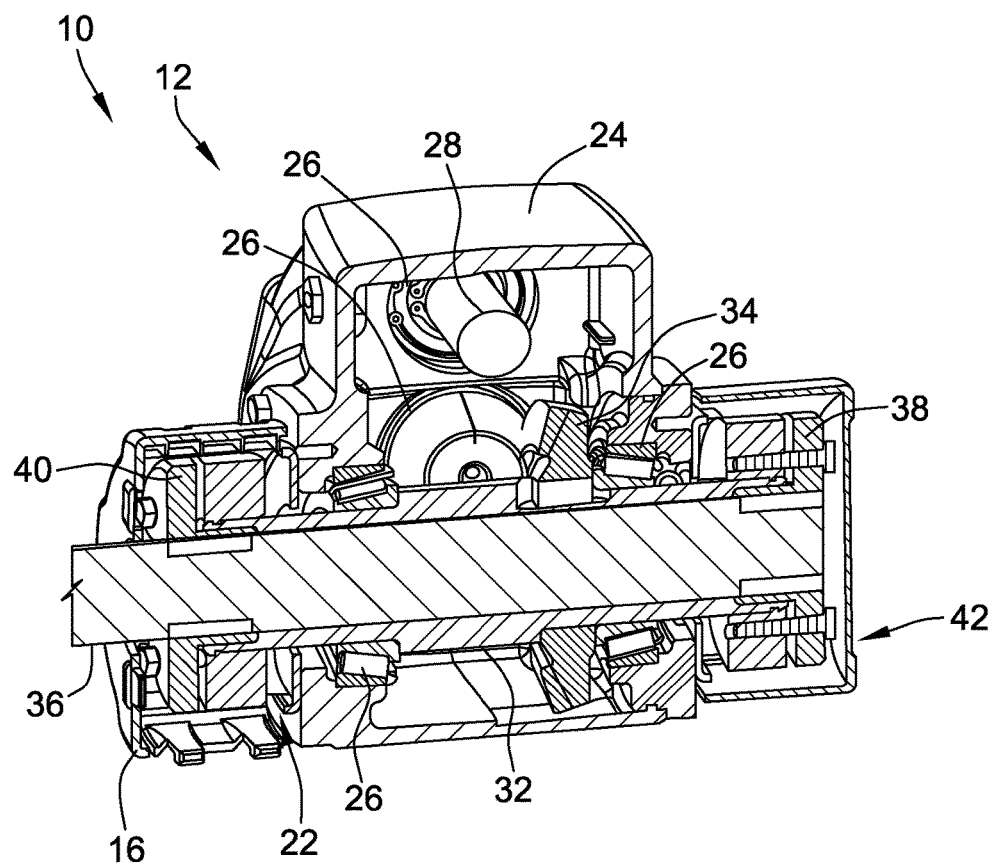
FIG. 2 is a perspective cross-section view of the drive assembly of FIG. 1 along the line 2-2 in the direction of the arrows.

Referring now to FIG. 2, drive 12 is shown in greater detail. The drive 12 may be any mechanical device that may be used to speed up or slow down the output speed of a rotating power transmission and/or may be used to change the operating height, angular orientation, or rotation direction of the output of the rotating power. Typically and as shown the drive is a gear box. Alternatively the drive may be a series of pulleys and belts, a series of cams and followers or a series of chains and sprockets.

As shown in FIG. 2, the drive 12 typically includes a housing 24 which supports a series of bearings 26 which rotatably support an input shaft 28 that is connected to motor 30 and an output shaft 32. Gears 34 transfer the torque from the input shaft 28 to the output shaft 32. The output shaft 32 may as shown be hollow and may receive a customer or application shaft 36. The application shaft 36 may be secured to and/or supported by the output shaft 32 by stub coupling 38 and shaft coupling 40.

While it should be appreciated that the invention may be practiced with a solitary cover, preferably and as shown in FIG. 2, the drive assembly 10 includes a stub end cover 42 adapted to cover the stub coupling 38 and shaft end cover 16 adapted to cover the shaft coupling 40.

Figure 3:
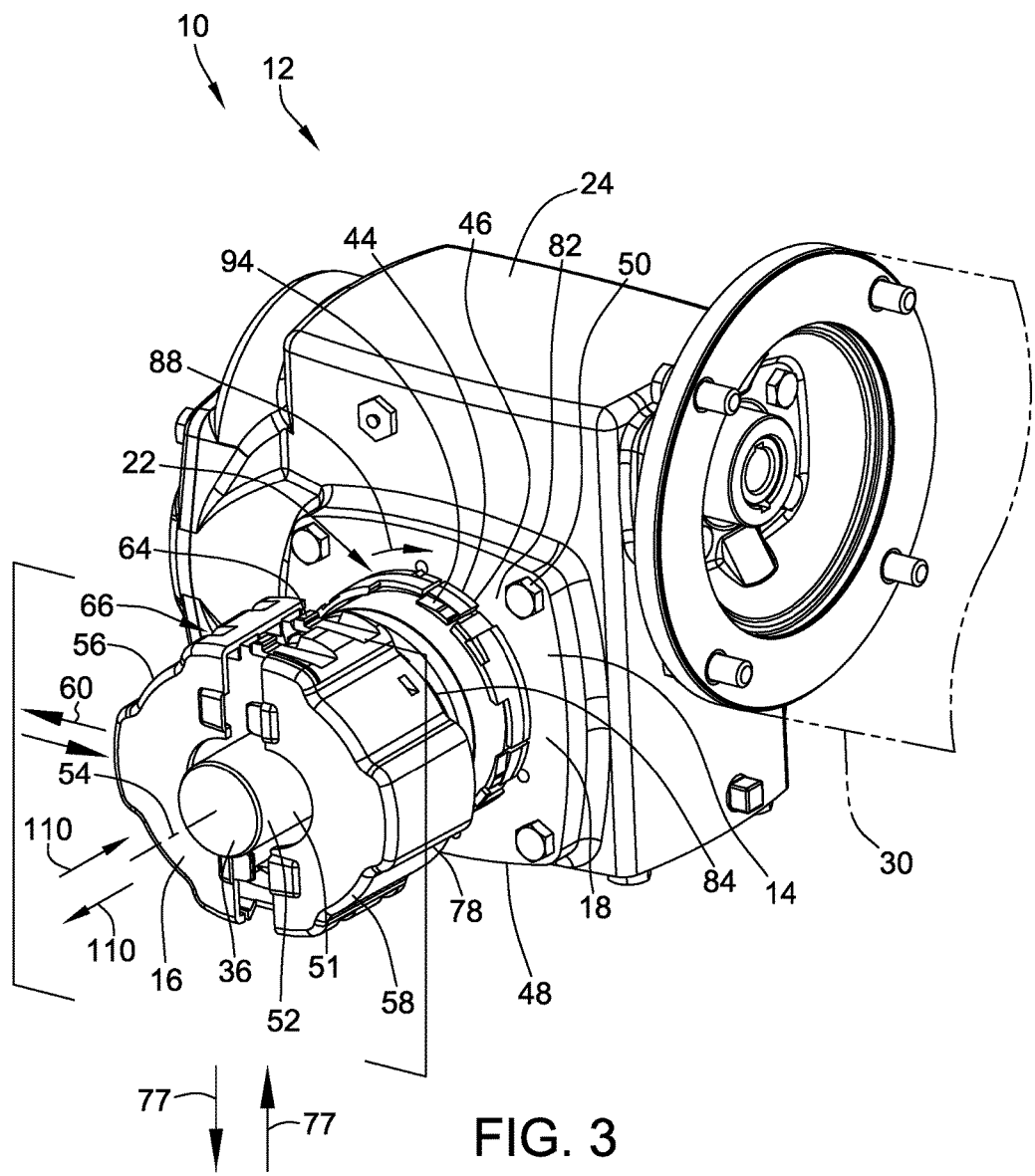
FIG. 3 is a partial perspective view of the drive assembly of FIG. 1, showing a shaft end cover partially assembled.

According to an aspect of the invention it should be appreciated that the adaptor 22 may be secured to the drive 12 of the drive assembly 10 in any suitable fashion. For example, the adaptor 22 may include openings (not shown) for receiving fasteners in the form of, for example, bolts (not shown) that are threaded into housing of the drive. The use of fasteners may be preferred in applications which require the drive assembly 10 to be periodically cleaned, such as where sanitation is important. In such environments adhesive securing of the adaptor 22 to the drive 12 may not be sufficient for the harsh chemicals or elevated temperatures required for such cleaning. Alternatively and as shown in FIG. 3, the adaptor 22 may be secured to drive assembly 10 with an adhesive 44 without the use of any fasteners. The adhesive 44 may be applied to housing side face 46 of mount or adapter 22. The adhesive may also be applied to the housing 24 directly or, as shown in FIG. 3, the drive assembly 10 may include a drive mounting plate 48 secured by bolts 50 to housing 24. As shown in FIG. 3, the adhesive 44 may be applied to feature 18 in the form of surface 18 of the drive mounting plate 48.

As shown in FIG. 3 and according to another aspect of the invention, the drive assembly 10 may be configured such that the drive 12 includes the application shaft 36 and such that the shaft end cover 16 is adapted to surround a first portion 51 of the shaft 36 and to permit a second portion 52 of the shaft 36 to extend away from the shaft end cover 16.

While it should be appreciated that the shaft end cover 16 may be assembled over shaft 36 by advancing the shaft 36 along shaft centerline 54, to ease in the assembly of the cover 16 onto the assembly 10, the drive assembly 10 may, as shown in FIG. 3, be configured such that the cover 16 includes a first component 56 and a second component 58. The first component 56 and the second component 58 may be selectably separated from each other and connected to each other. The separate components 56 and 58 permit the components 56 and 58 to be assembled together around the shaft 36. The components, for example and as shown in FIG. 3, may be connected by advancing them in the direction of arrows 60 in a direction normal to shaft centerline 54. Alternatively, the components may be connected by advancing them in the direction along shaft centerline 54.

The first component 56 and the second component 58 may be connected to each other in any suitable way. Preferably, the components 56 and 58 are lockable to each other. The components 56 and 58 may be lockable in any suitable way and may be lockable by locking feature 62. According to yet another aspect of the invention and referring to FIGS. 3-5, the drive assembly may be configured such that the first component 56 and/or the second component 58 include a first portion of locking feature 62 in the form in of a protrusion 64 and such that the other of the first component 56 and/or the second component 58 defines a second portion of locking feature 62 in the form of an aperture 66, in the form of for example a slot, adapted to receive the protrusion 64.

While any number of protrusions may be used and may be placed anywhere convenient, as shown, each of the components 56 and 58 of the cover 16 includes a protrusion 64. Similarly, while any number of apertures 66 may be used and may be placed anywhere convenient, as shown, each of the components 56 and 58 of the cover 16 includes an aperture 66 that is positioned to cooperate with the protrusion 64.

The protrusion 64 may, as shown, include a locking hook 68 which cooperates with a face 70 adjacent the aperture 66 to lock the components 56 and 58 together. Upon being joined together, the protrusion 64 is deflected at the hook 68 as it passes within the aperture 66 until the hook 68 engages face 70.

Figure 4:
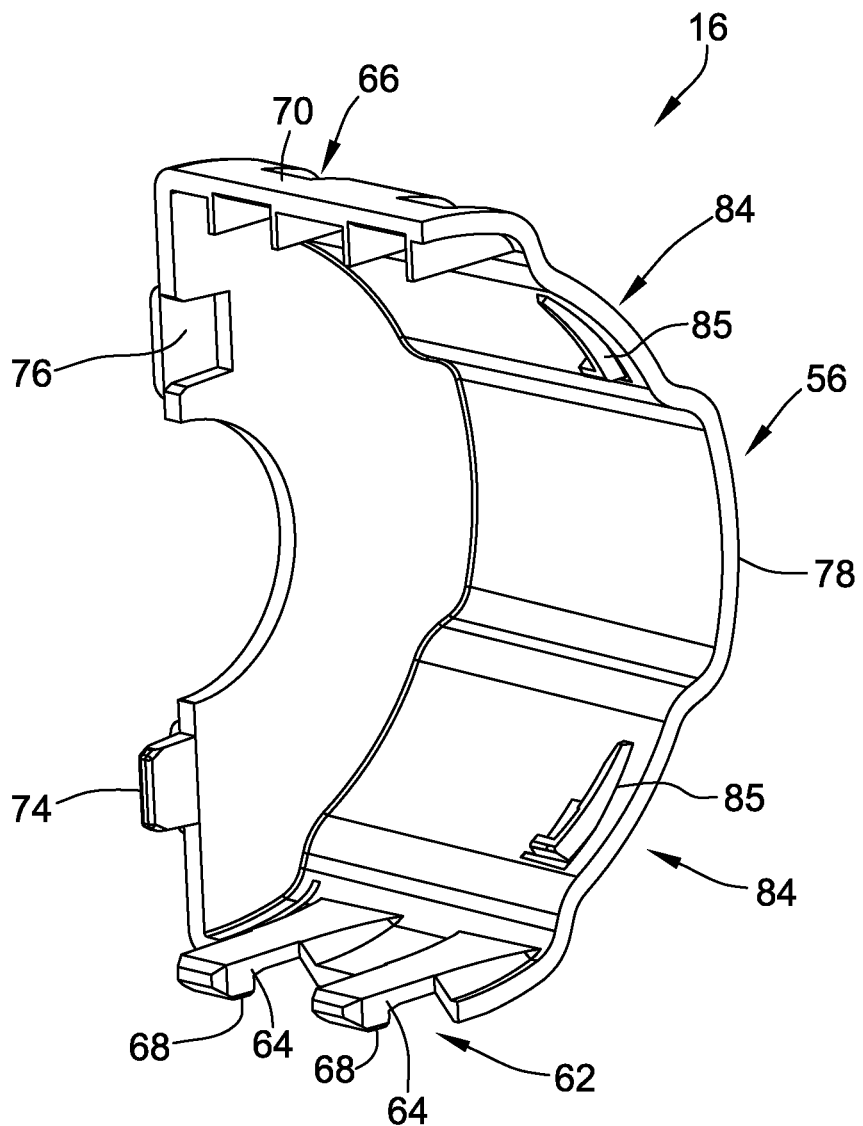
FIG. 4 is a perspective view of one half of the shaft end cover of FIG. 3.
Figure 5:
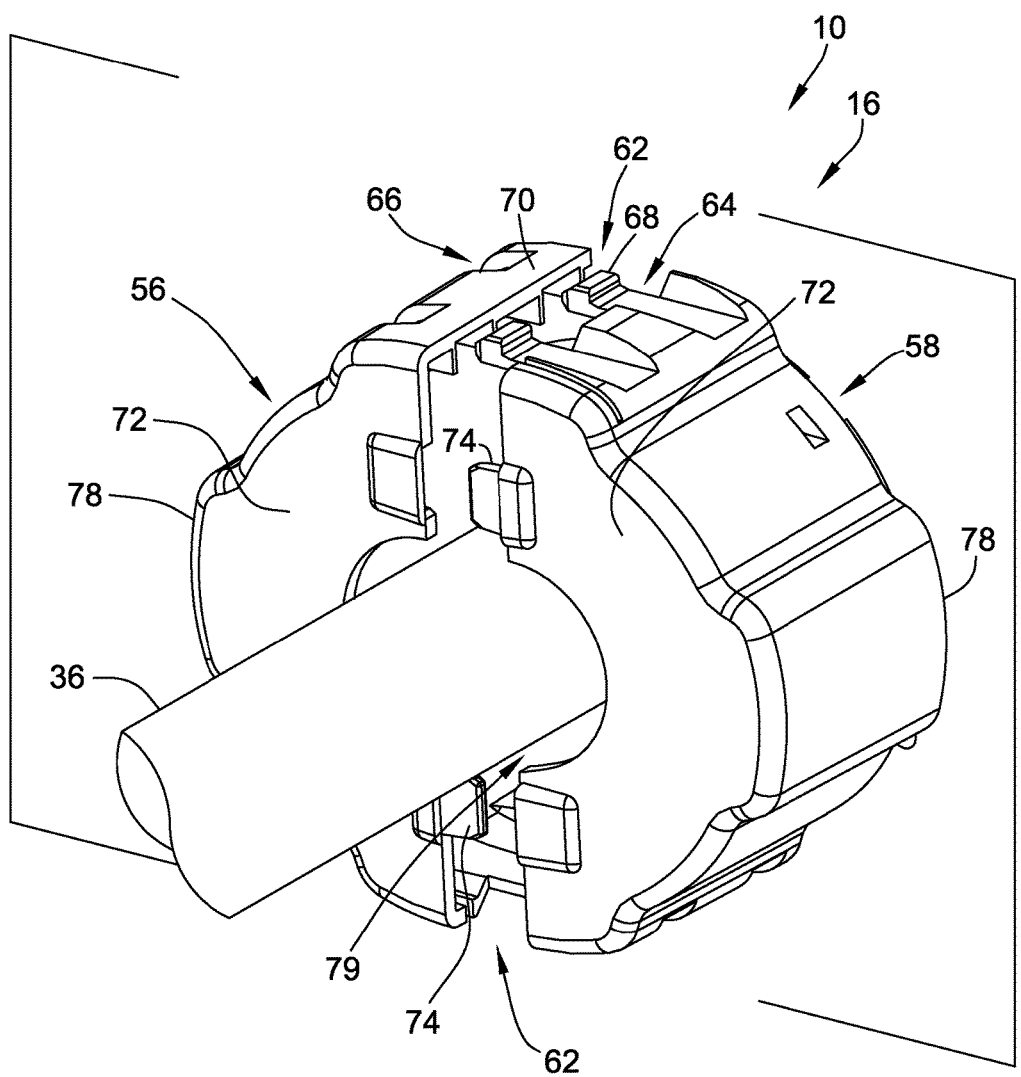
FIG. 5 is a partial perspective view of the shaft end cover of FIG. 3, showing the shaft end cover portion unassembled.

As shown in FIGS. 3-5, outer face 72 of the components 56 and 58 may also include an outer face tab 74 which cooperates with outer face recess 76. The tab 74 and recess 76 serve to limit relative motion between the portions of the face 72. The limiting of the relative motion may, as shown in FIG. 3, limit motion along shaft centerline 54, in the direction of arrows 54 and 60, as well as, in the direction of arrows 77.

While the cover may have any suitable shape to cover the couplings, preferably and according to yet another aspect of the invention, the drive assembly 10 may be configured such the cover 16 includes a feature 78 to assist in holding the cover. The feature 78 may be any feature that provides a surface to assist in assembling or removing the cover. The feature 78 may be a protrusion as shown or any shape.

As shown the cover 16 may include a central opening 79 for passage of the shaft 36 through the cover 16.

While the first component 56 and the second component 58 may be different or have a different shape or construction, for simplicity and as shown in FIGS. 3-5, the first component 56 may be identical to the second component 58. Having such components being identical reduces tooling costs, decreases part piece cost, decreases customer repair part inventory costs and provides for other savings. Having such components being identical also reduces the likelihood that first component 56 is incorrectly assembled to second component 58 or that body 20 is incorrectly assembled to adaptor 22.

According to yet another aspect of the invention and retelling to FIGS. 3-7, the drive assembly 10 may be configured such the mount 22 is in the form of the adaptor 22 and such that the adaptor 22 includes the body feature in the form of adaptor mounting face 80 for cooperating with feature 18 in the form of face 18 of the mounting plate 48.

The drive assembly may, as shown, be further configured such the adaptor 22 also includes a body feature 82 for cooperating with the body 20 to removeably secure the body 20 to the drive 12 and such that the body 20 includes an adaptor feature 84 for cooperating with the adaptor 22 to removeably secure the body 20 to the drive 12.

As shown in FIGS. 3-7, the body feature of the adaptor 22 may be in the form a face 80 of the adaptor 22. The feature 18 of the body may include surface 18 of the drive mounting plate 48. The drive may also include adhesive 44 positioned on the face 80 of the adaptor 22 and on the surface 18 of the drive mounting plate 48.

It should be appreciated that the body 20 may be secured to the adaptor 22 in any suitable manner. For example the body 20 may be assembled onto the adapter in any suitable direction and may for example the body 20 may be advanced along shaft centerline or axis 54 toward adaptor 22 for assembly. If advanced in such a direction, the body 20 may, for example, be press fit onto the adaptor or may be snapped onto the adaptor using resilient lips, clips or fingers.

Alternatively and according to yet another aspect of the invention, the drive assembly 10 may be configured such that the body feature 82 of the adaptor 22 and the adaptor feature 84 of the body 20 provide for a spiral securing and removing the body 20 to and from the adaptor 22. One configuration of a spiral securing is a threaded connection where the body feature and/or the adaptor feature are in the form of threads (not shown) which mate with each other.

According to yet another aspect of the invention, the drive assembly 10 may be configured such that either the body feature of the adaptor or the adaptor feature of the cover include a protrusion extending from the cover and such that the other of the body feature of the adaptor or the adaptor feature of the cover defines a void for receiving the protrusion.

As shown in FIGS. 3-7, drive assembly 10 may be configured such that the adaptor feature 84 of the body 20 includes a protrusion 85 extending from the body 20 and such that the body feature 82 of the adaptor 22 includes a void 86 for receiving the protrusion 85. It should be appreciated that alternatively the adaptor feature 84 of the body 20 may include the void and that the body feature 82 of the adaptor 22 may include the protrusion.

As shown in FIGS. 3-7 the body 20 may be secured to the adaptor 22 by means of a bayonet mounting. With a bayonet mounting the cover is advanced first along shaft axis 54 with the protrusion 85 of the body 20 aligned with the void 86 of the adaptor 22 so that the body 20 may be fully advanced along the axis 54. After the advancing along the axis 54, the body 20 is then spirally secured to the adaptor 22 by rotating the cover in the direction of arrows 88.

According to yet another aspect of the invention and as shown in FIGS. 3-7, the drive assembly 10 may be configured such that the body feature 82 of the adaptor 22 includes a flange 92 and such that the adaptor feature 84 of the body 20 includes an inner periphery 90 of the body 20.

According to yet another aspect of the invention and as shown in FIGS. 3-7, the drive assembly 10 may be configured such that the adaptor feature 84 of the body 20 further includes a protrusion 85 extending from the inner periphery 90 of the cover and such that the flange 92 of the adaptor 22 defines void 86 for receiving the protrusion 85.

Figure 6:
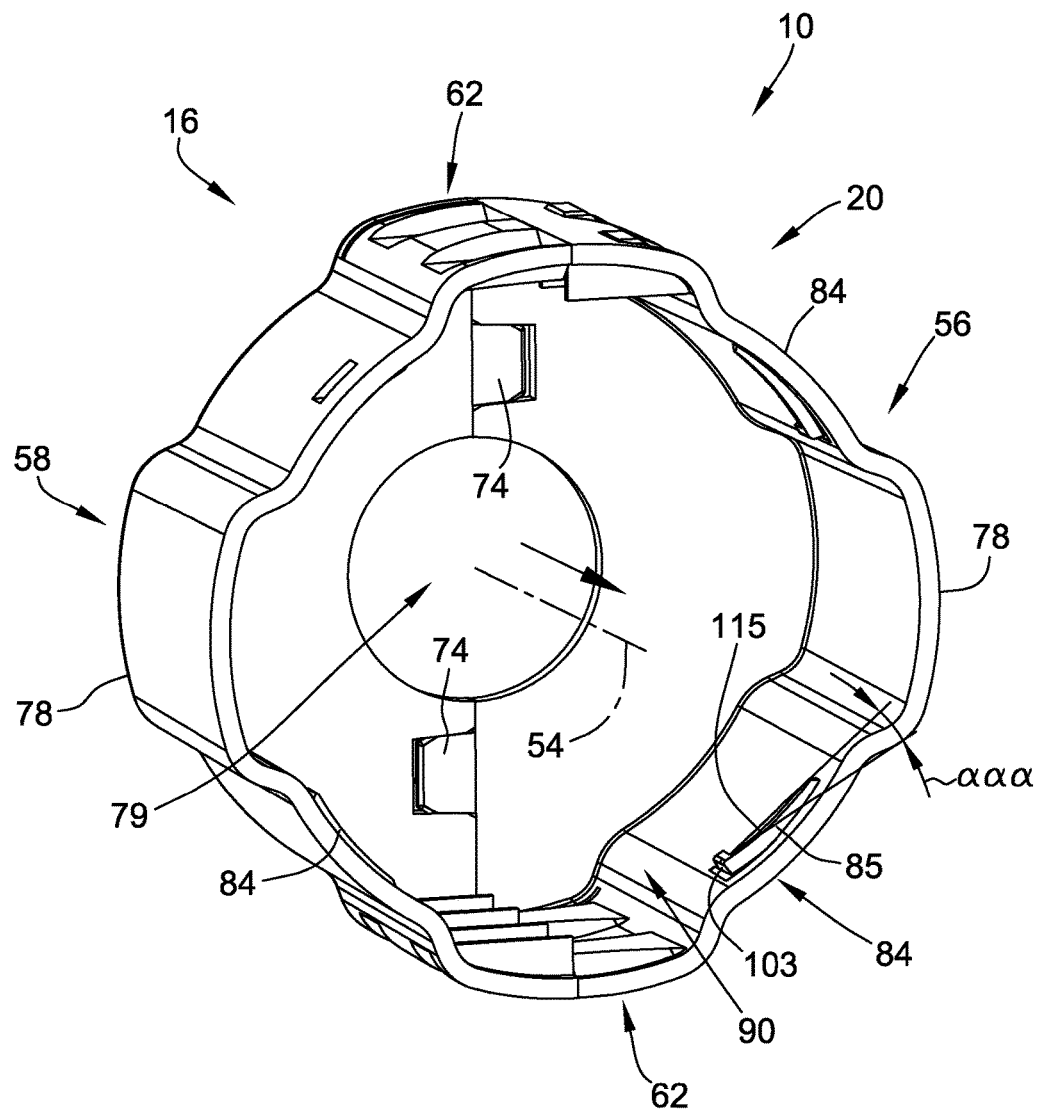
FIG. 6 is a perspective view of the shaft end cover of FIG. 3.
Figure 7:
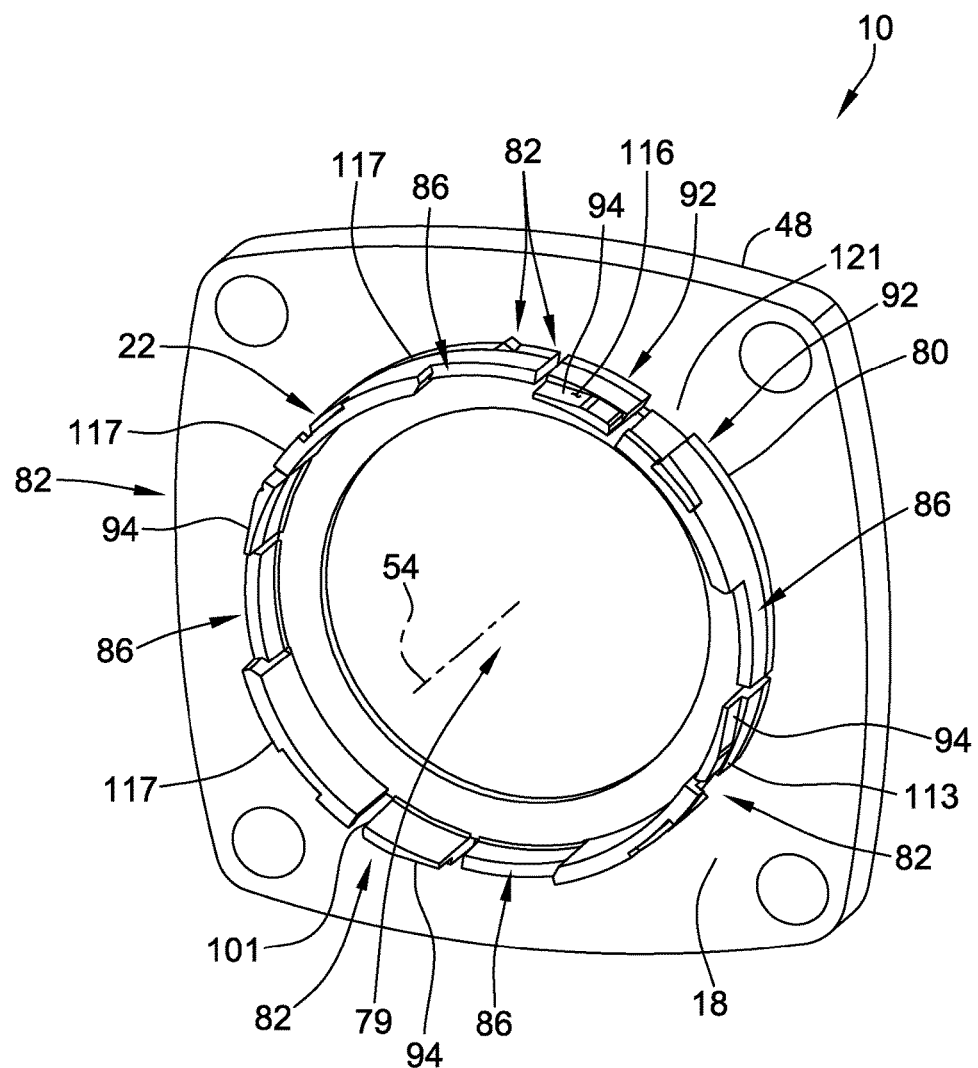
FIG. 7 is a perspective view of the adaptor of FIG. 3 positioned on a plate of the drive assembly.

According to yet another aspect of the invention and as shown in FIGS. 3-7, the drive assembly may be configured such that at least a portion of either the body feature 82 of the adaptor 22 and the adaptor feature 84 of the body 20 is resilient and such that at least a portion of the body feature 82 of the adaptor 22 and at least a portion of the adaptor feature 84 of the body 20 cooperate to lock the body 20 to the adaptor 22. As shown in FIG. 7, resilient ramp 94 is made of a resilient material, for example a metal or a polymer.

Figure 8:
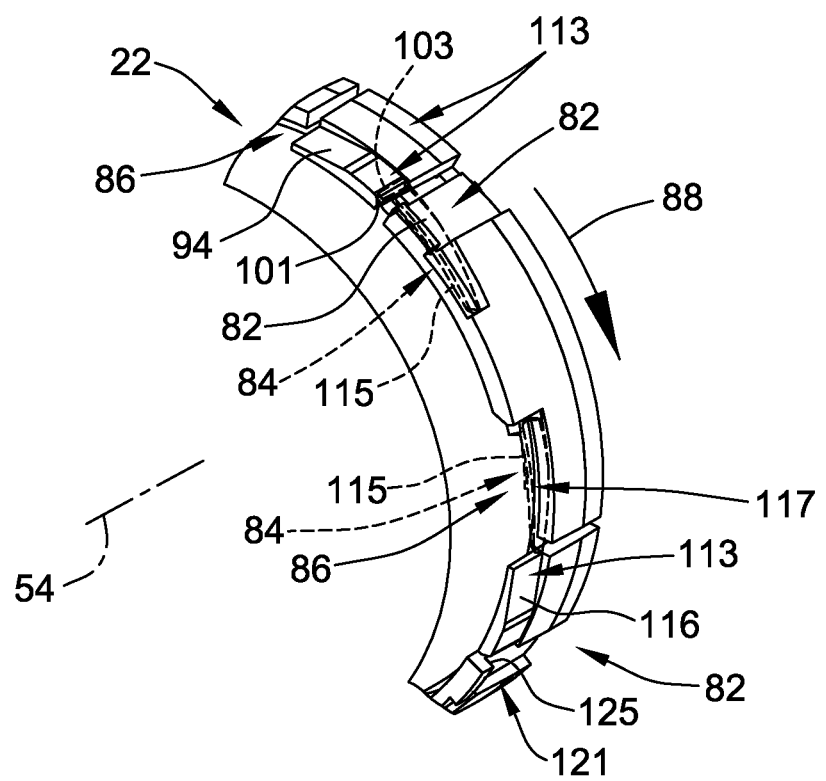
FIG. 8 is a partial perspective view of the adaptor of FIG. 3.

Referring to FIGS. 7 and 8, the resilient ramp 94 flexes into flexed position 96, as shown in phantom, when the protrusion 85 of the body 20 is advanced in the direction of arrows 88. When the protrusion passes the ramp 94, the ramp returns to unflexed position 98, as shown in solid, and end face 101 of the ramp 94 engages end face 103 of the protrusion 85, locking the body 20 to the adaptor 22.

Referring now to FIGS. 3 and 7-19 the adaptor 22 is shown in greater detail. While the adaptor may have any shape and design capable of removeably securing the cover to the drive 12, a bayonet and/or a spirally engaging design may be preferred for its ease of assembly and soundness of its engagement.

As shown in FIGS. 7 and 8, the adaptor 22 may be secured to planar surface 18 of drive mounting plate 48. The adaptor 22 may include a planar portion 105 having a central opening 107 for passage of the shaft 36 through the adaptor. The planar portion 105 may include a recessed back face 109 for receiving the adhesive 44 for joining the adaptor 22 to the drive mounting plate 48. The planar portion 105 may further include a cylindrical periphery 106 for receiving the generally cylindrical flange 92. The flange 92 engages with the body 20 (see FIG. 3) to secure the body 20 to the drive 12 (see FIG. 3).

Figure 9:
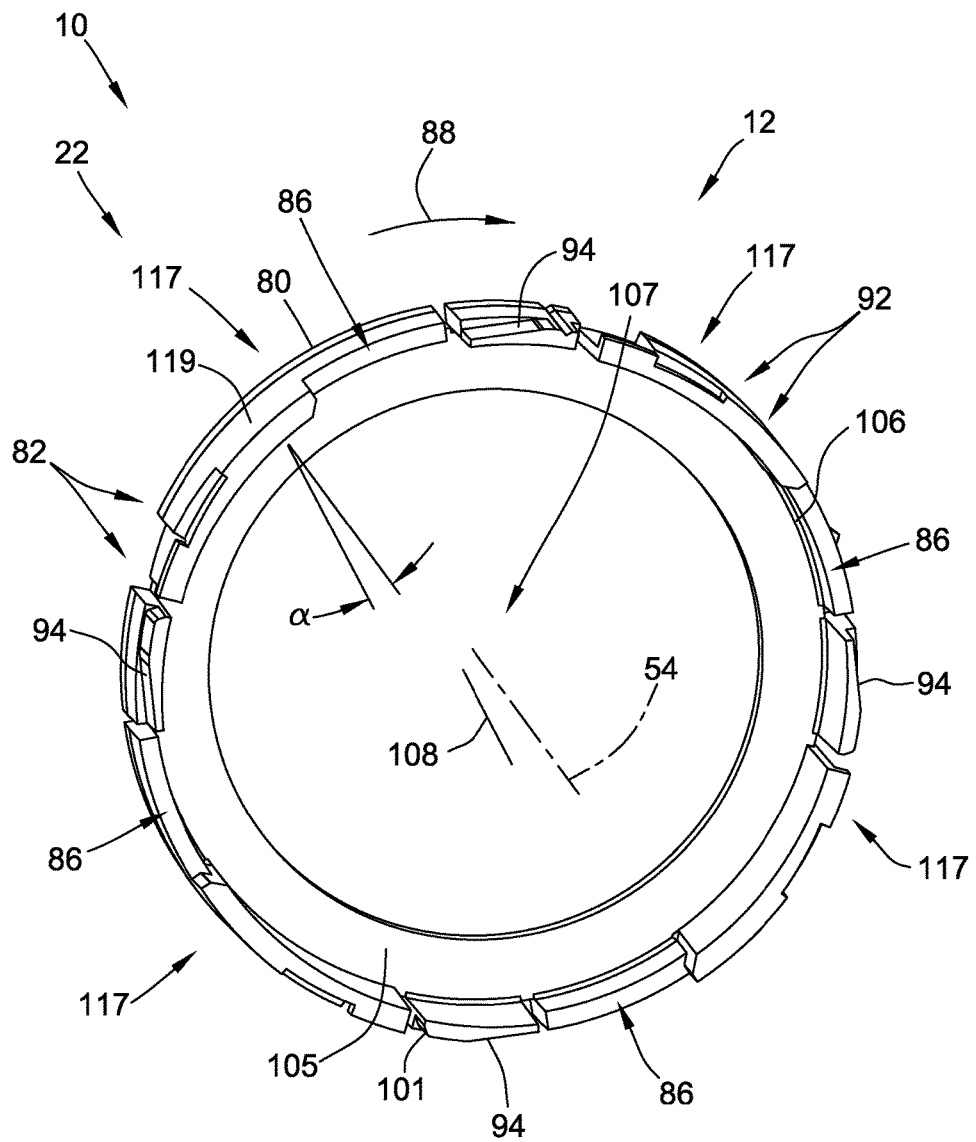
FIG. 9 is a perspective view of the adaptor of FIG. 3 for use on the drive assembly of FIG. 1 for mounting the covers thereto.

Referring now to FIG. 9, the flange 92 may be tapered inwardly along shaft centerline 54 in the direction of arrow 108 defined by angle α. Similarly and as shown in FIG. 9, the body 20 may be tapered inwardly along shaft centerline 54 in the direction of arrow 110 defined by angle β. The angles α and β are preferably selected to provide matting contact with the respective surfaces of the body 20 and the adaptor 22. The taper is selected to provide for a suitable flexing of the cylindrical flange 92 of the adaptor 22 as it engages inner periphery 90 of body 20. As the adapter feature 84 of the body 20 is engaged by the body feature 82 of the adaptor 22, the protrusion 85 of the body 20 is seated in slot 121 of the adaptor 22. So that the protrusion 85 is seated in the slot 121 and so that there is suitable flexing of the cylindrical flange 92 of the adaptor 22 as it engages inner periphery 90 of body 20, the body is spaced slightly from the face of the plate. As shown in FIGS. 6-8, as the body 20 is advanced along shaft axis 54 in the direction of arrow 111, the protrusion 85 of body 20 is aligned with void 86 in the cylindrical flange 92 of the adaptor 22. Once the protrusion 85 of the body 20 is advanced into the void 86 of the adaptor 22, the body 20 is rotated in the direction of arrows 88 such that the protrusion 85 advances over outer periphery 113 of the cylindrical flange 92 of the adaptor 22.

Inner face 115 of the protrusion 85 engages ramped surface 116 of the resilient ramp 94. The ramped surface 116 is defined by a ramp angle γ and the ramp 94 is deflected inwardly into flexed position 96 as the body 20 is rotated in the direction of arrows 88. When the protrusion 85 passes the ramp 94, the ramp returns to the unflexed position 98, as shown in solid, and stop 101 of the ramp 94 engages end 103 of the protrusion 85, locking the body 20 to the adaptor 22. As the ramp 94 returns to the unflexed position 98, it may be configured to make a distinctive clicking noise that is an audible indication that the body 20 has been successfully assembled.

As the protrusion 85 advances in the direction of arrows 88 it advances over second portion 117 of the cylindrical flange 92 of the adaptor 22. The second portion 117 has an outer periphery 119 that defines a slot 121 for receiving the protrusion 85 of body 20. As the protrusion 85 enters slot 121, engaging face 123 of protrusion 85 engages engaging face 125 of slot 121. The engaging faces 123 and 125 are tapered to provide an urging of the body 20 toward adaptor 22. As the body 20 is rotated in the direction of arrows 88, protrusion 85 engages face 125 of slot 121 in a spiral fashion urging the body 20 in the direction of the adaptor 22.

Figure 10:
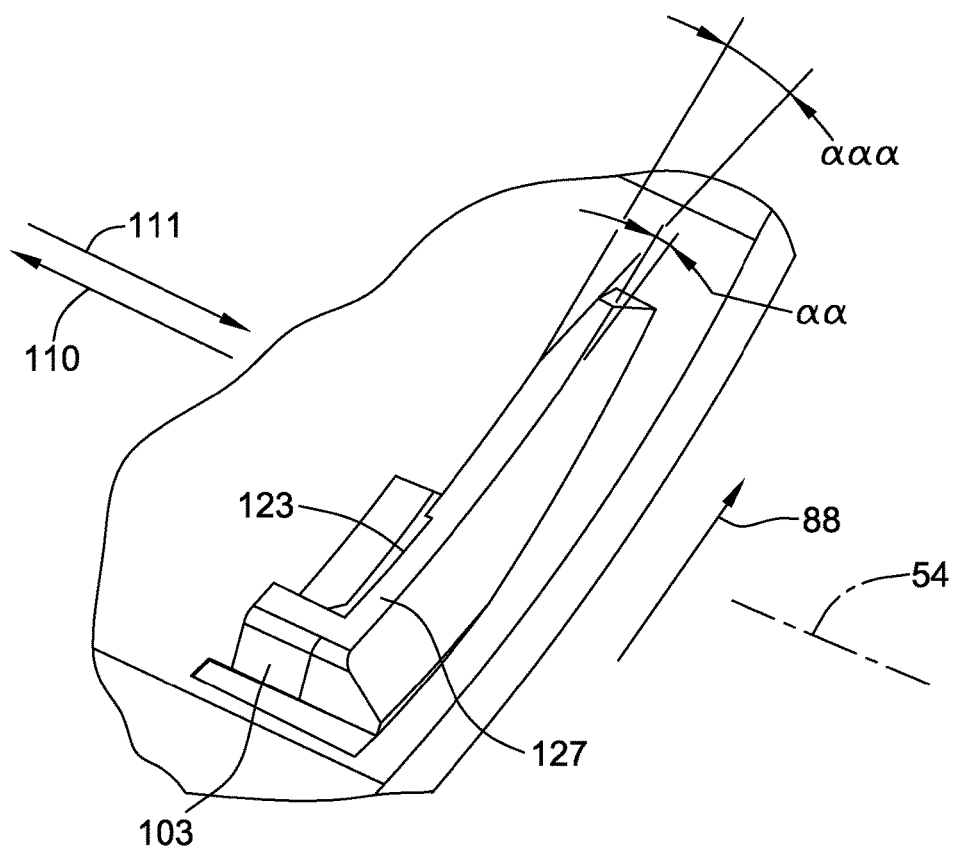
FIG. 10 is a partial perspective view of the shaft end cover of FIG. 3 showing the cover protrusion in greater detail.
Figure 11:
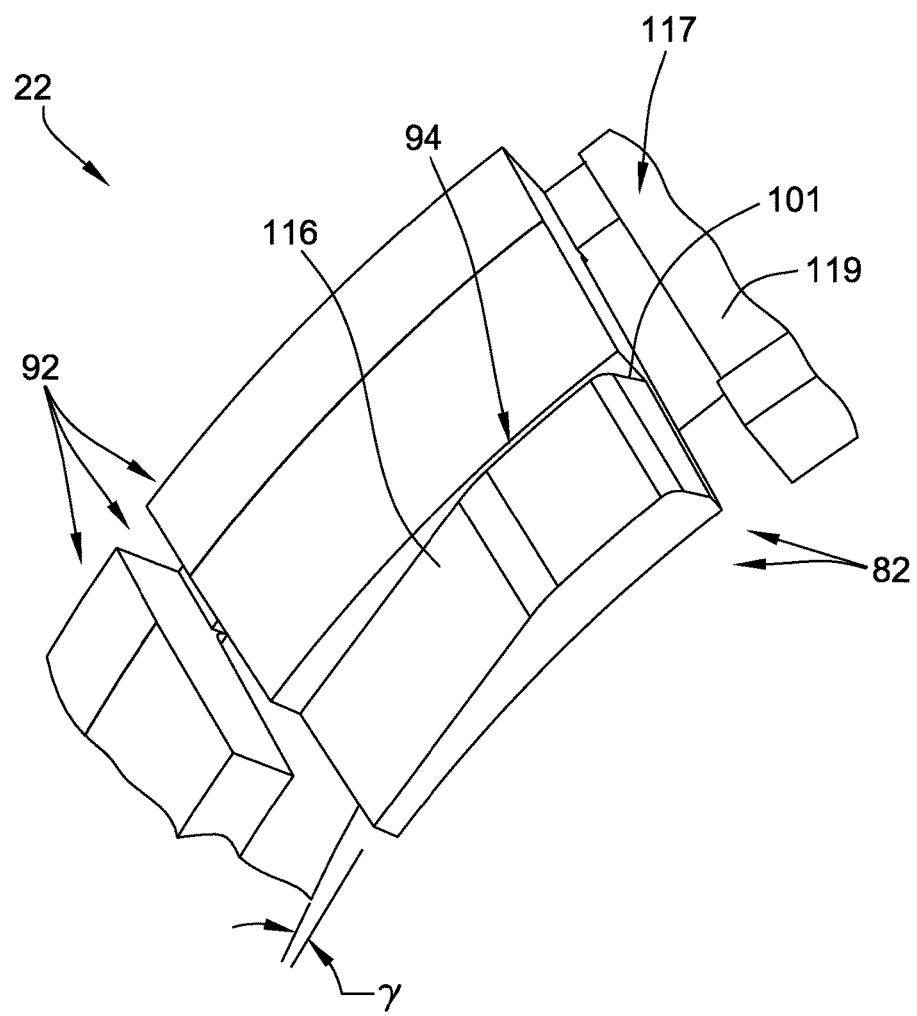
FIG. 11 is a partial perspective view of the adaptor of FIG. 9 showing the adaptor protrusion in greater detail.
Figure 12:
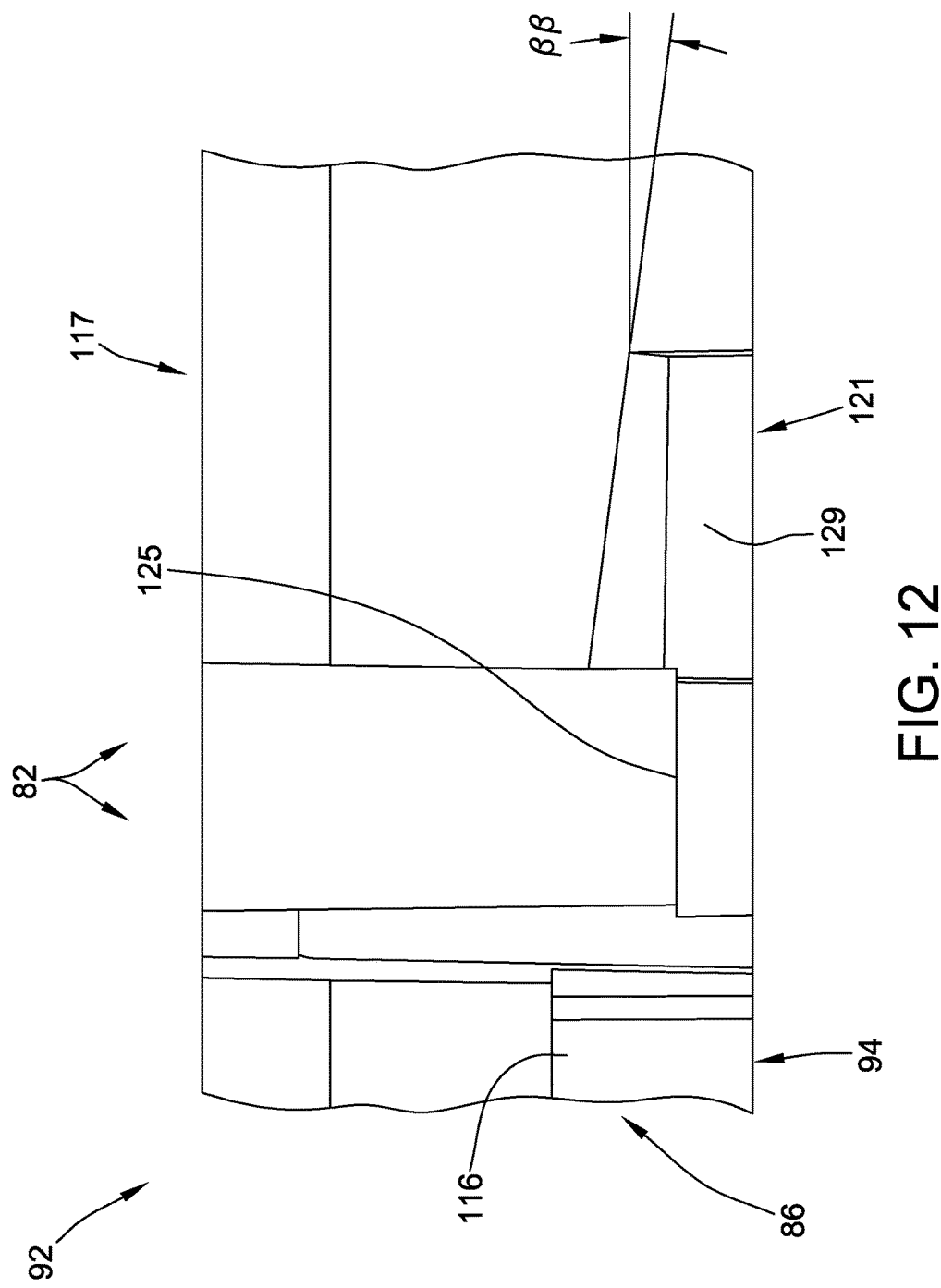
FIG. 12 is yet another partial perspective view of the adaptor of FIG. 9 showing the adaptor slot in greater detail.
Figure 13:
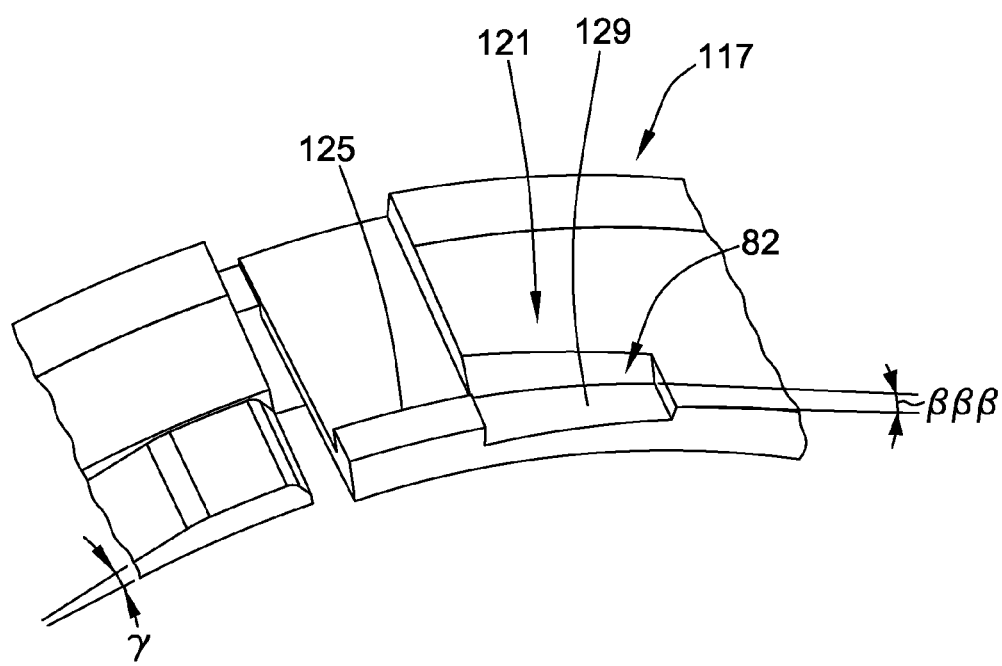
FIG. 13 is yet another partial perspective view of the adaptor of FIG. 9 showing the adaptor slot in greater detail.

As shown in FIG. 12 engaging face 123 of protrusion 85 is normal to shaft axis 54. It should be appreciated that alternatively the engaging face 123 may be at an angle to the shaft axis 54 defined by angle αα. Similarly engaging face 125 of slot 121 is normal to shaft axis 54. It should be appreciated that alternatively the engaging face 125 may be at an angle to the shaft axis 54 defined by angle ββ. If the engaging faces are at angles to the shaft axis 54, the angles αα and ββ are preferably selected to enhance engagement of the protrusion 85 to the slot 121. As shown in FIGS. 10 and 13, when the protrusion 85 is fully engaged in slot 121, inner circumferential contact surface 127 of protrusion 85 engages circumferential contact surface 129 of slot 121. Preferably the contact between surfaces 127 and 129 is minimal to reduce or eliminate any deflection and residual pressure on the protrusion 85, though some residual pressure may be desired to ensure a tight fit between the body 20 and the adaptor 22 when assembled. The circumferential contact surface 127 of protrusion 85 is tapered as defined by taper angle ααα and the circumferential contact surface 129 of slot 121 is tapered as defined by taper angle βββ. The taper or angles ααα and βββ are preferably selected to provide matting contact with the respective surfaces of the body 20 and the adaptor 22.

According to an embodiment of the invention and as shown in FIGS. 3-7, cover 16 for use on drive 12 is shown. The cover 16 is adapted to be received by feature 18 on the drive 12. The cover includes a body 20 and a mount or adaptor 22. The mount or adaptor 22 is operably associated with the body 20. The mount or adaptor 22 is also adapted to cooperate with feature 18 on the drive 12 to removeably secure the body 20 to the drive 12. The mount or adaptor 22 and the body 20 are separate components.

According to an aspect of the invention, the cover 16 may be configured such that the mount or adaptor 22 and the feature 18 on the drive 12 are adapted for use with fasteners (not shown) to connect the mount or adaptor 22 to the drive 12 instead of the adhesive 44 shown in FIG. 3.

While any number of protrusions 85 may be used and may be placed anywhere convenient, as shown, the body 20 includes four equally spaced apart protrusions 85. Similarly, while the adaptor 22 may include any number of body features 82 including the voids 86 and the pockets 121 and may be placed anywhere convenient, as shown, adaptor 22 includes four equally spaced apart body features 82 that are positioned to cooperate with the protrusions 85.

Figure 14:
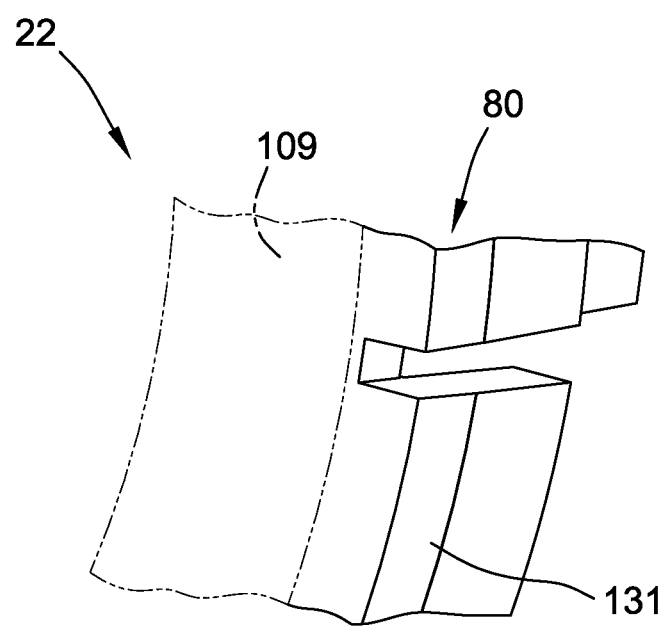
FIG. 14 is yet another partial perspective view of the adaptor of FIG. 9 showing the recessed face in greater detail.

As shown in FIG. 14, the mounting face 80 of the adaptor 22 may be recessed and includes outer circumferential ring 131 and inner recessed face 109. The recessed face 109 receives the adhesive 44 and the depth of the recess is selected to accept an optimum amount of adhesive. The ring 131 prevents access to the adhesive during washing of the drive 12.

Referring now to FIGS. 15-19 stub end cover 42 for covering the stub coupling 38 is shown in greater detail. The stub end cover 42 is used to protect and cover stub coupling 38.

The stub end cover 42 is adapted to cover at least a portion of exterior 18 of the drive 12. The stub end cover 42 has a body 20 and a mount 22 operably associated with the body 20. The mount 22 is adapted to cooperate with the feature 14 on the drive 12 to removeably secure the cover 42 to the drive 12. The mount 22 and the body 20 are separate components. As shown in FIG. 2, the mount 22 is in the form of adaptor 22.

Figure 15:
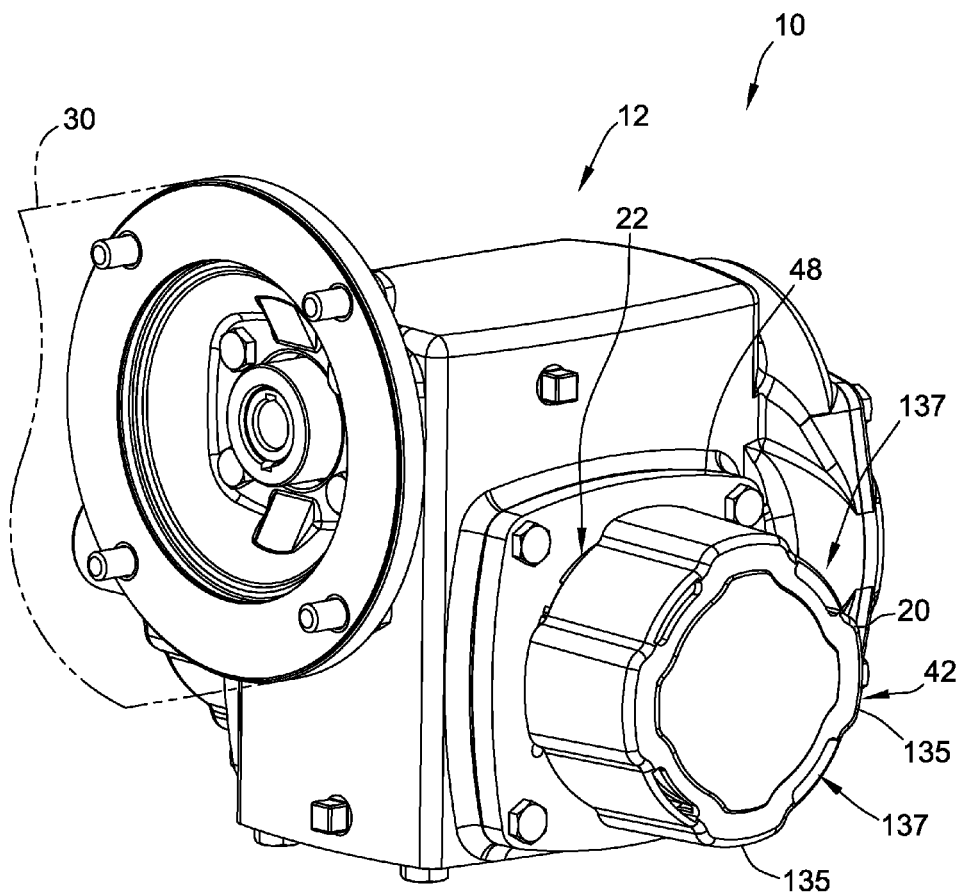
FIG. 15 is another perspective view of the drive assembly of FIG. 1, showing the opposite side of the assembly.
Figure 16:
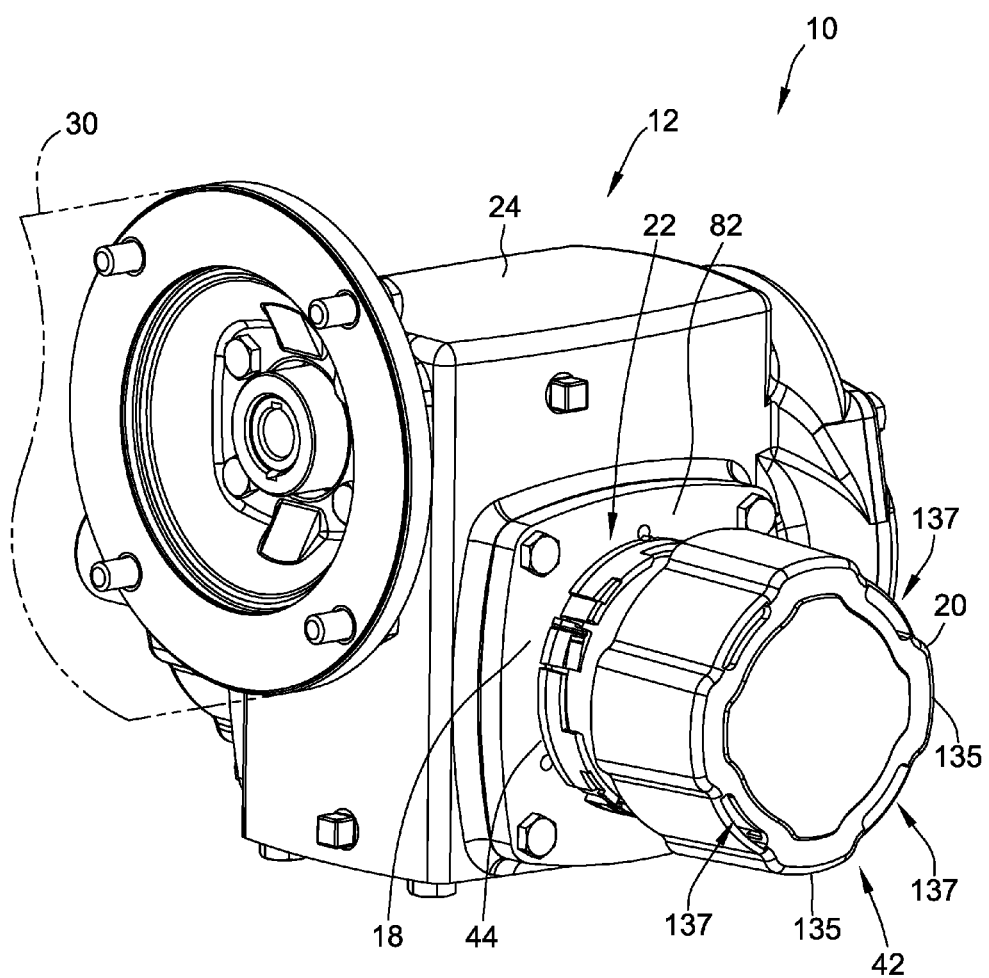
FIG. 16 is a partial perspective view of the drive assembly of FIG. 15, showing a stub end cover partially assembled.

As shown in FIG. 15, the stub end cover 42 may be removeably connected to the drive 12 by adaptor 22. The adaptor for connecting the stub end cover 42 may be different than adaptor 22 for securing the shaft end cover 16, but for simplicity and to minimize cost, the adaptor for connecting the stub end cover 42 is identical to the adaptor for securing the shaft end cover 16. The adaptor 22 for connecting the stub end cover 42 to the drive 12 may be connected to the drive 12 by fasteners, clips, tabs or as shown by an adhesive that is identical to adhesive 44 for securing the shaft end cover 16. The adaptor 22 for connecting the stub end cover 42 to the drive 12 may be connected directly to the drive 12, or as shown be connected to drive mounting plate 48.

Figure 17:
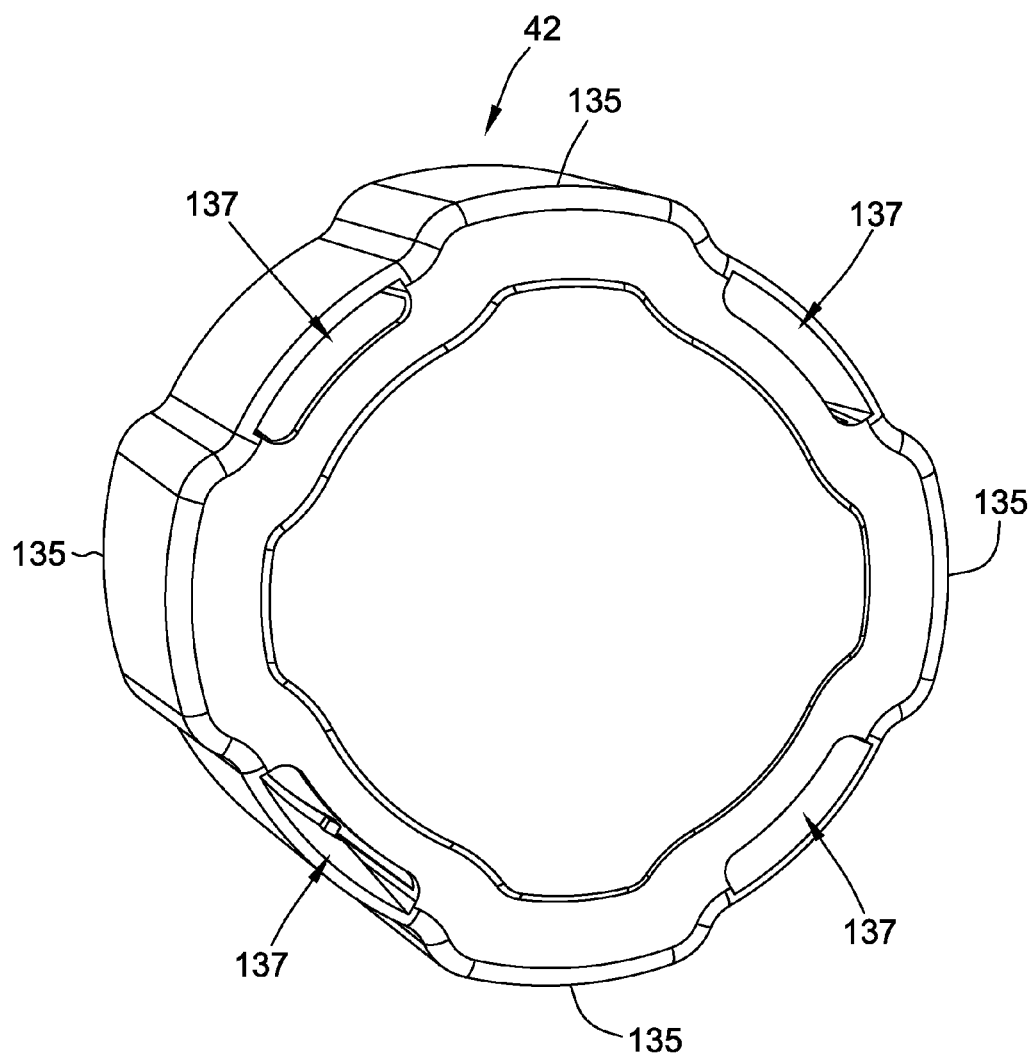
FIG. 17 is a perspective view of the stub end cover of the drive assembly of FIG. 16.
Figure 18:
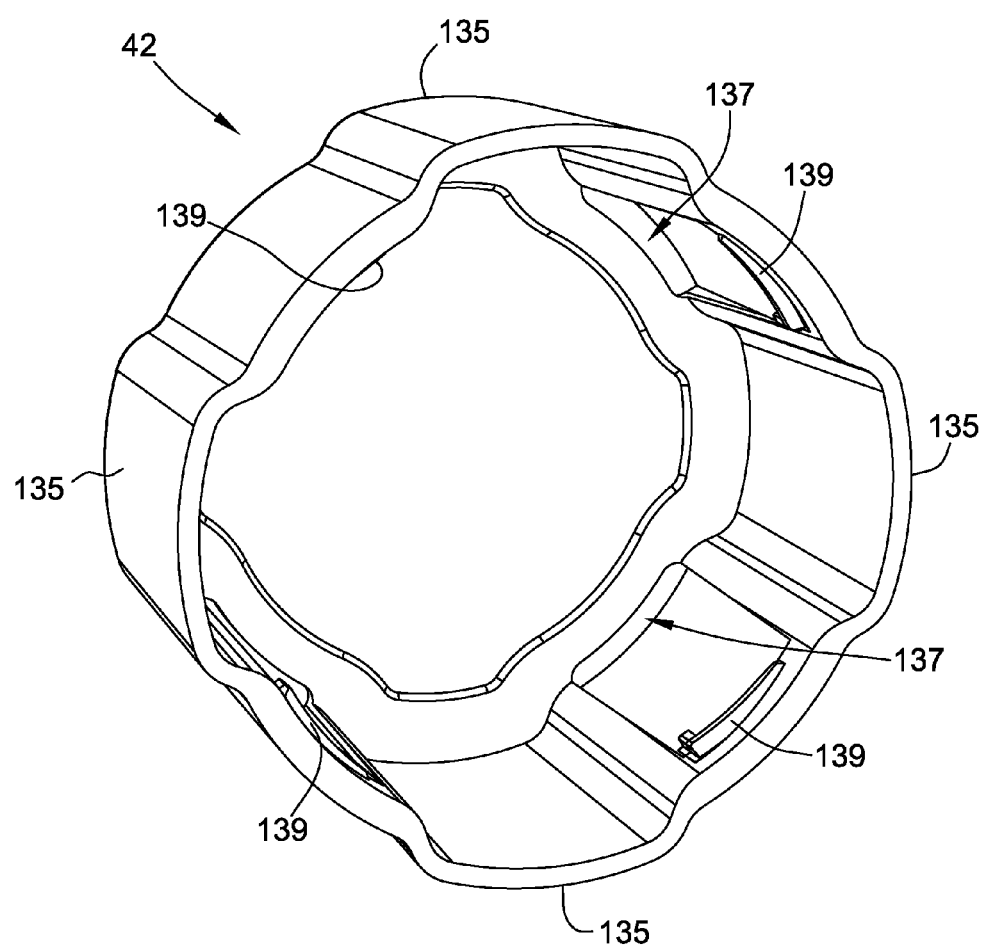
FIG. 18 is a perspective view of the stub end cover of FIG. 17, showing the opposite side of the cover.
Figure 19:
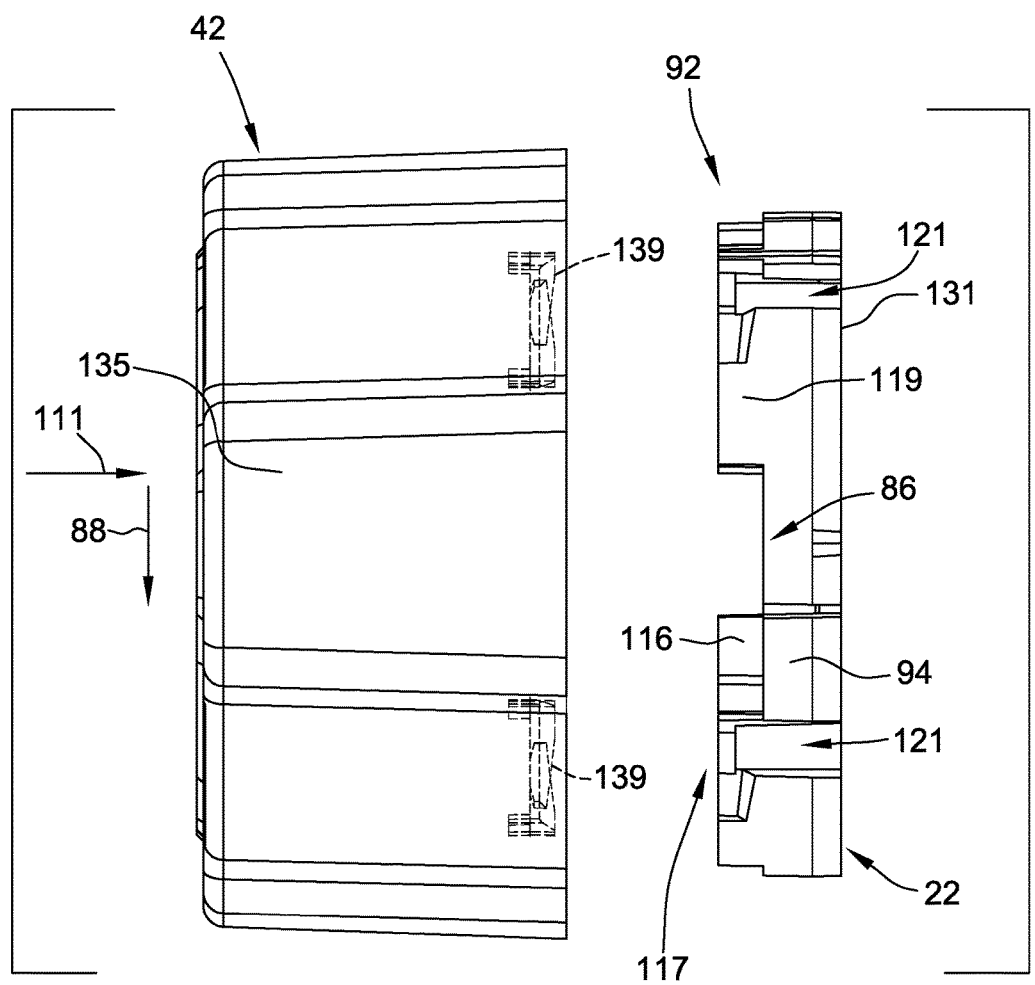
FIG. 19 is a plan view of the stub end cover of FIG. 17 positioned in alignment with the adaptor of FIG. 9.

As shown in FIGS. 17-19, the stub end cover 42 may have a shape generally similar to the shaft end cover 16. The stub end cover 42 may include features 135 similar to features 78 for securing the cover 42 and for providing additional torque when hand assembling the cover 42 to the drive 12. While any number of features 135 may be used and place wherever convenient, as shown four equally spaced apart features 135 are provided.

As shown in FIG. 18, the stub end cover 42 may have openings 137 for assisting in draining water from the cover when cleaning the drive. The openings 137 may also assist in molding the stub end cover 42 by aligning the openings with features 139 in the form of protrusions in the cover 42. Such positioning of openings 137 may permit the use of less expensive molding dies.

As shown in FIG. 18 the stub end cover 42 may include the protrusions 139 similar to protrusions 85 located on shaft end cover 16 of FIGS. 1-9. While any number of protrusions 139 may be used and may be positioned wherever convenient, as shown four equally spaced protrusions 139 are used.

The protrusions 139 are used similarly to the protrusions 85 of the shaft end cover 16 and cooperate with the flange 92 of the adaptor 22 to secure the stub end cover 42 to the adaptor 22.

As shown in FIG. 19, the cover 42 is assembled onto adaptor 22 by first advancing cover 42 in the direction of arrow 111 while the protrusions 139 are aligned with voids 86 in the flange 92 of the adaptor 22. Then the cover 42 is rotated in the direction of arrow 88 while protrusions 139 advance over the ramps 94 and into the pockets 121 of the flange 92. Finally, the protrusions 139 are locked by the ramps 94.

Figure 20:
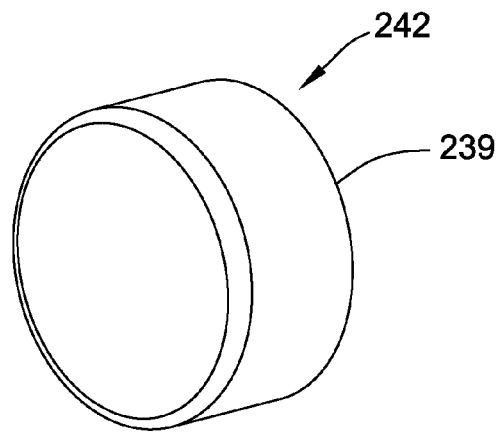
FIG. 20 is a perspective view of an alternate cover for the stub end of the drive assembly of FIG. 1.
Figure 21:
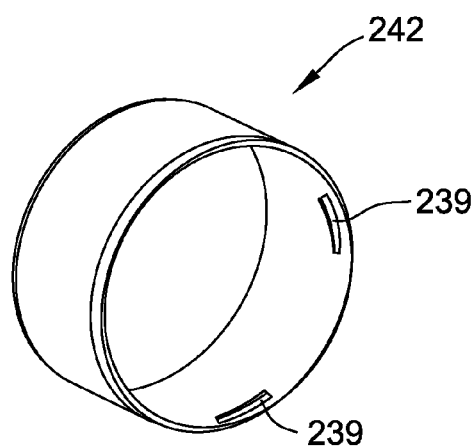
FIG. 21 is a perspective view of the opposed end of the cover of FIG. 20.

According to yet another embodiment of the invention and referring now to FIGS. 20 and 21, stub end cover 242 is shown. Stub end cover 242 is similar to stub end cover 42 of FIGS. 15-19 except stub end cover 242 has a generally cylindrical exterior and does not have the cover securing features 135 of the stub end cover 42. The cover 242 may include surface roughness (not shown) to assist to turning the cover for assembly or removal of the cover. The stub end cover 242 has four equally spaced apart protrusions 239 similar to protrusions 139 of the stub end cover 42 of FIGS. 15-19. The stub end cover 242 may be used in the drive assembly 10 of FIGS. 1-9.

Figure 22:
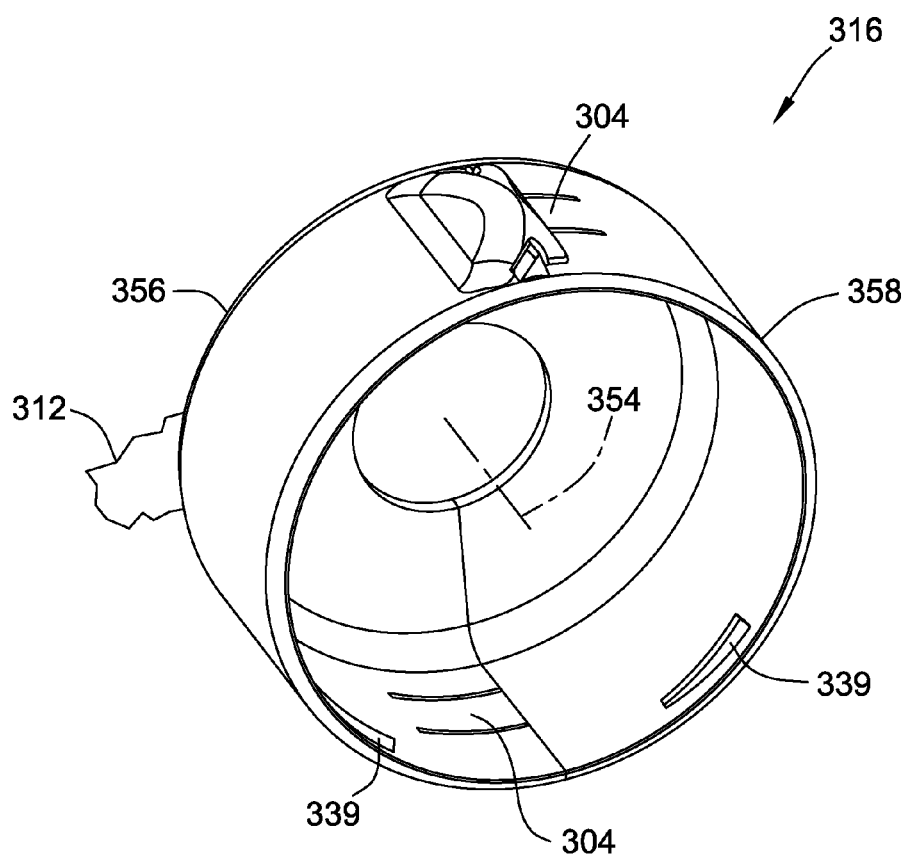
FIG. 22 is a perspective view of an alternate cover for the shaft end of the drive assembly of FIG. 1.
Figure 23:
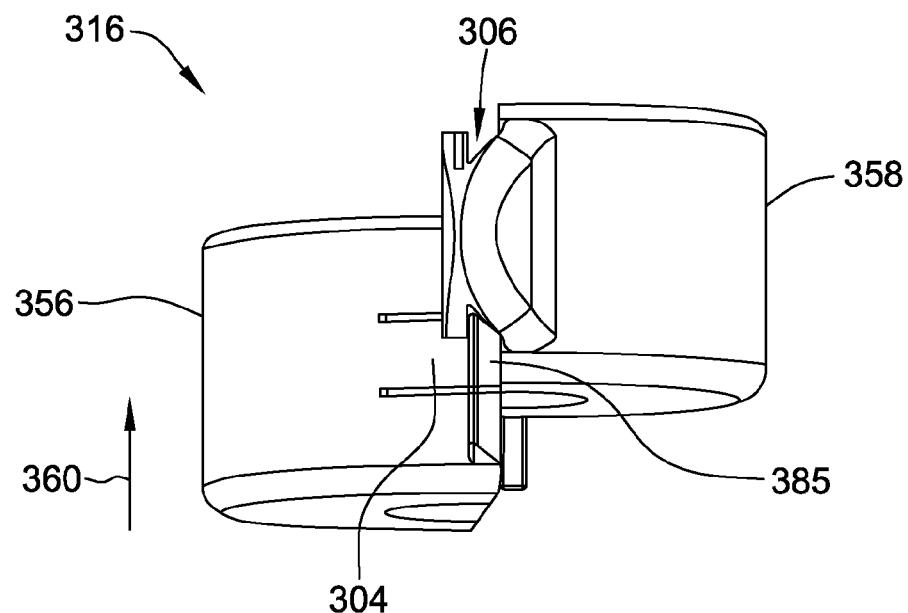
FIG. 23 is a plan view of the alternate cover of FIG. 22; Reference 306 should point directly at slot.
Figure 24:
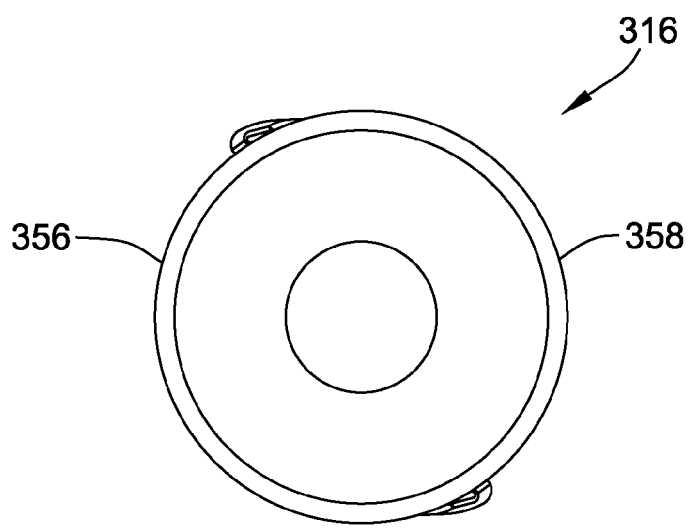
FIG. 24 is an end view of the alternate cover of FIG. 22.
Figure 25:
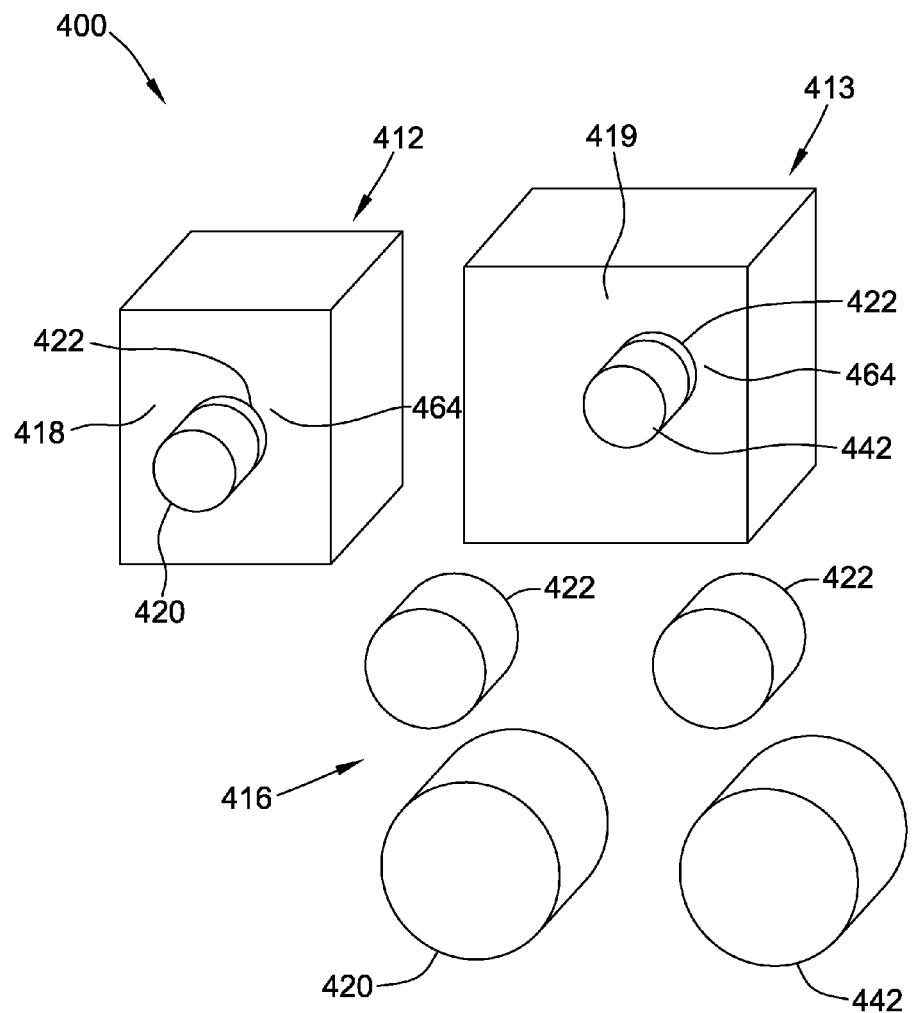
FIG. 25 is perspective view of a kit according to another embodiment of the invention.

According to yet another embodiment of the invention and referring now to FIGS. 22-24, shaft end cover 316 is shown. Shaft end cover 316 is similar to shaft end cover 16 of FIGS. 3-10 except shaft end cover 316 has a generally cylindrical exterior and does not have the cover securing features 78 of the shaft end cover 16 of FIGS. 3-10. The cover 316 may include surface roughness (not shown) to assist to turning the cover for assembly or removal of the cover. The shaft end cover 316 has four equally spaced apart protrusions 339 similar to protrusions 85 of the shaft end cover 16 of FIGS. 3-10.

Further, the shaft end cover 316 is adapted for assembly onto drive 312 in the direction of arrow 360 along shaft centerline 354, rather than in the direction of normal to shaft centerline 54 of the cover 16 of FIGS. 3-10. The shaft end cover 316 includes a recessed tab 304 with an extension 385 that cooperates with axial slot 306 to permit assembly of the first component 356 of the cover 316 to the second component 358 of the cover 316. Note that the first component 356 and the second component 358 may as shown be identical to each other.

According to yet another aspect of the invention, a kit 400 is provided. The kit 400 includes a first drive 412 having a cover mounting feature 418 and a second drive 413 having a cover mounting feature 419. The first drive 412 and the second drive 413 may be associated with entirely different machines or the first drive and the second drive may be on different portions of the same machine. Alternately, the first drive 412 and the second drive 413 may be different faces or ends of the same gear box or drive. The kit 400 further includes a cover 416 adapted to cover a selectable one of at least a portion of the first drive 412 and at least a portion of the second drive 413. The cover 416 includes an adaptor mounting feature 464. The kit 400 further includes an adaptor 422 adapted to cooperate with a selected one of the cover mounting feature 418 of the first drive 412 and the cover mounting feature 419 of the second drive 413 to secure the adaptor 422 to the selected one of the first drive 412 and the second drive 413. The adaptor 422 further adapted to cooperate with adaptor mounting feature 464 of the cover 416 to removeably secure the cover 416 to the selected one of the first drive 412 and the second drive 413.

According to yet another aspect of the invention, the kit 400 may be configured such that the body 420 and the mount 422 are adapted to permit the body 420 of the cover 416 to be assembled onto a selected one of the first drive 412 and the second drive 413 using at least one fastener (not shown). Note an alternate body 442 may be assembled onto a selected one of the first drive 412 and the second drive 413. The alternate body 442 may be similar or different from the body 420 of the cover 416.

The use of the kit 400 permits one cover and adaptor to be used on a variety of different drives and drive assemblies, lowering cover manufacturing costs, tooling costs and customer inventory costs.

The methods, systems, and apparatus described herein facilitate efficient and economical assembly of a machine. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", and "the" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Described herein are exemplary methods, systems and apparatus utilizing improved covering of moving exterior portions of a machine that reduces the effort to access the machine for repair. Furthermore, the exemplary methods system and apparatus achieve reduced cost. The methods, system and apparatus described herein may be used in any suitable application. However, they are particularly suited for mechanical gear boxes.

Exemplary embodiments of the cover and drive assembly are described above in detail. The cover and drive assembly are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

What is claimed is:
1. An assembly, comprising:
a gearbox having a housing with a surface thereof and having a shaft defining a shaft centerline thereof;
an adaptor mounted to the surface of the gearbox housing;
a first hollow cover component having a generally cylindrical inner periphery for closely conforming to the shaft and having a generally planar periphery coplanar to the shaft centerline when said first hollow cover component is mounted to said adaptor; and;
a second hollow cover component having a generally cylindrical inner periphery for closely conforming to the shaft and having a generally planar periphery coplanar to the shaft centerline when said second hollow cover component is mounted to said adaptor, the generally planar periphery of the second hollow cover component mating with the generally planar periphery of the second hollow cover component so that the first hollow cover component and the second hollow cover component ma be assembled to each other in a direction perpendicular to the shaft centerline, wherein the inner periphery of the first hollow cover component, the inner periphery of the second hollow cover component and the adaptor include a bayonet locking feature to engage the hollow cover components to the adaptor.

2. The assembly in accordance with claim 1, wherein said first hollow cover component and said second hollow cover component are identical.

3. The assembly in accordance with claim 2, wherein said first hollow cover component and said second hollow cover component each have a feature that cooperates with each other to resiliently secure the cover components to each other.

4. The assembly in accordance with claim 1, wherein said first hollow cover component and said second hollow cover component each have a snap locking feature that cooperate with each other to resiliently secure the cover components to each other.

5. The assembly in accordance with claim 1, wherein the first hollow cover component includes a tab extending from the generally planar periphery for cooperation with a recess on the second hollow cover component.

6. The assembly in accordance with claim 1, wherein said adaptor is mounted to the surface of the gearbox housing by one of fasteners and an adhesive.

7. The assembly in accordance with claim 1:
wherein one of said first component and said second component comprises a protrusion; and
wherein the other of said first component and said second component defines a cavity adapted to receive said protrusion.

8. The assembly in accordance with claim 1, wherein at least one of said first hollow cover component and said second hollow cover component comprises a feature to assist in grabbing said at least one of said first hollow cover component and said second hollow cover component.

9. The assembly in accordance with claim 1, wherein said first hollow cover component and said second hollow cover component each have a snap locking feature that cooperate with each other to resiliently secure the cover components to each other.

10. The assembly in accordance with claim 9, wherein said snap locking feature of said first hollow cover component and said snap locking feature of said second hollow cover component comprises a resilient cantilevered protrusion having a hook on its distal end.

11. The assembly in accordance with claim 1:
wherein said adaptor comprises a surface thereof; and
further comprising an adhesive positioned on the surface of said adaptor and on the surface of the gearbox housing.

12. The assembly in accordance with claim 1, wherein said adaptor and said cover components provide for one of a linear, rotational, or spiral securing and removing of said cover components to said adaptor.

13. The assembly in accordance with claim 10, wherein said snap locking feature of said first hollow cover component and said snap locking feature of said second hollow cover component each further comprise a cavity for receiving and cooperating with the hook of said respective resilient cantilevered protrusion.

14. The assembly in accordance with claim 1:
wherein said first hollow cover component and said second hollow cover component each comprise a planar surface normal to the planar periphery of the respective hollow cover component;
wherein said first hollow cover component and said second hollow cover component each comprise a tab extending from the planar surface and past the planar periphery of the respective hollow cover component; and
wherein said first hollow cover component and said second hollow cover component each define a void for receiving the tab of the respective hollow cover component.

15. An assembly, comprising:
a gearbox having a housing with a surface thereof and having a shaft defining a shaft centerline thereof;
an adaptor mounted to the surface of the gearbox housing;
a first hollow cover component having a generally cylindrical inner periphery for closely conforming to the shaft and having a generally planar periphery coplanar to the shaft centerline when said first hollow cover component is mounted to said adaptor; and;
a second hollow cover component having a generally cylindrical inner periphery for closely conforming to the shaft and having a generally planar periphery coplanar to the shaft centerline when said second hollow cover component is mounted to said adaptor, the generally planar periphery of the second hollow cover component mating with the generally planar periphery of the second hollow cover component so that the first hollow cover component and the second hollow cover component may be assembled to each other in a direction perpendicular to the shaft centerline, wherein said adaptor comprises a bayonet mount adaptor feature on an external periphery thereof and said cover components comprise a bayonet mount cover feature on an internal periphery thereof.

16. The assembly in accordance with claim 15, wherein said bayonet mount adaptor feature and said bayonet mount cover feature comprise protrusions.

17. The assembly in accordance with claim 16, wherein said protrusions are helically shaped.

* * * * *